United States Patent
Bergmann et al.

(10) Patent No.: US 9,014,753 B2
(45) Date of Patent: Apr. 21, 2015

(54) COMMUNICATION SYSTEM AND INFORMATION SYSTEM FOR A MOTOR VEHICLE

(75) Inventors: Carsten Bergmann, San Jose, CA (US); Zhaoxia Zhang, Sunnyvale, CA (US); Will Specks, Wolfsburg (DE); Klaus Schaaf, Braunschweig (DE)

(73) Assignee: Volkswagen AG, Wolfsburg (DE)

( * ) Notice: Subject to any disclaimer, the term of this patent is extended or adjusted under 35 U.S.C. 154(b) by 1019 days.

(21) Appl. No.: 11/547,328

(22) PCT Filed: Jan. 24, 2005

(86) PCT No.: PCT/EP2005/000654
§ 371 (c)(1),
(2), (4) Date: Nov. 20, 2007

(87) PCT Pub. No.: WO2005/105509
PCT Pub. Date: Nov. 10, 2005

(65) Prior Publication Data
US 2008/0103612 A1 May 1, 2008

Related U.S. Application Data

(60) Provisional application No. 60/557,950, filed on Mar. 31, 2004.

(51) Int. Cl.
*H04M 1/00* (2006.01)
*H04M 1/60* (2006.01)
(Continued)

(52) U.S. Cl.
CPC .......... *H04M 1/6091* (2013.01); *B60R 11/0235* (2013.01); *H04M 2250/02* (2013.01); *H04M 2250/16* (2013.01); *H04M 2250/22* (2013.01)

(58) Field of Classification Search
CPC .......... H04M 1/6091; H04M 1/6083
USPC .......... 455/556.1, 569.2
See application file for complete search history.

(56) References Cited

U.S. PATENT DOCUMENTS 5,619,684 A   4/1997  Goodwin et al.
5,920,826 A * 7/1999  Metso et al. .......... 455/557
(Continued)

FOREIGN PATENT DOCUMENTS

DE   198 35 433   2/2000
DE   102 05 641   8/2003
(Continued)

OTHER PUBLICATIONS

International Search Report, PCT International Patent Application No. PCT/EP2005/000654, dated Jun. 23, 2005.
(Continued)

*Primary Examiner* — Ayodeji Ayotunde
(74) *Attorney, Agent, or Firm* — Kenyon & Kenyon LLP

(57) ABSTRACT

In a communications system for a motor vehicle, the communications system includes: an interface for exchanging data between the communications system and a mobile telephone; a display with an assigned controller for displaying an image of the mobile telephone, the image including at least one control element, or for displaying a portion of an image of the mobile telephone, the portion of the image also having at least one control element; and a touch screen, which is located above the display and serves to operate the mobile telephone by touching the touch screen in the area of the displayed control element or by pressing upon the touch screen in the area of the displayed control element.

35 Claims, 8 Drawing Sheets

(51) Int. Cl.
*H04B 1/38* (2006.01)
*B60R 11/02* (2006.01)

(56) References Cited

U.S. PATENT DOCUMENTS

| | | | | |
|---|---|---|---|---|
| 6,028,593 | A * | 2/2000 | Rosenberg et al. | 345/156 |
| 6,232,957 | B1 * | 5/2001 | Hinckley | 345/156 |
| 6,559,773 | B1 * | 5/2003 | Berry | 340/815.4 |
| 6,640,169 | B2 | 10/2003 | Bergmann et al. | |
| 6,978,316 | B2 * | 12/2005 | Ghaffar et al. | 709/246 |
| 7,348,961 | B1 * | 3/2008 | Shneidman | 345/156 |
| 2002/0002432 | A1 * | 1/2002 | Bockmann et al. | 701/48 |
| 2002/0036642 | A1 * | 3/2002 | Kwon et al. | 345/531 |
| 2002/0042289 | A1 * | 4/2002 | Kabatek | 455/557 |
| 2002/0054043 | A1 * | 5/2002 | Nishiyama | 345/441 |
| 2002/0138178 | A1 | 9/2002 | Bergmann et al. | |
| 2003/0027604 | A1 * | 2/2003 | Hayashi | 455/567 |
| 2003/0120397 | A1 | 6/2003 | Bergmann et al. | |
| 2003/0142125 | A1 * | 7/2003 | Salmimaa et al. | 345/733 |
| 2004/0092253 | A1 * | 5/2004 | Simonds et al. | 455/414.2 |
| 2004/0157589 | A1 * | 8/2004 | Watanabe et al. | 455/415 |
| 2005/0079896 | A1 * | 4/2005 | Kokko et al. | 455/566 |
| 2006/0271964 | A1 * | 11/2006 | Rodriguez et al. | 725/61 |
| 2008/0200213 | A1 * | 8/2008 | De Bast | 455/566 |

FOREIGN PATENT DOCUMENTS

| | | |
|---|---|---|
| DE | 203 10 288 | 9/2003 |
| EP | 1 125 784 | 8/2001 |
| EP | 1 168 784 | 1/2002 |
| EP | 1 245 430 | 10/2002 |
| WO | 00/21795 | 4/2000 |

OTHER PUBLICATIONS

Written Opinion of the International Searching Authority, PCT International Patent Application No. PCT/EP2005/000654, dated Jun. 23, 2005 (translation provided).

* cited by examiner

COMMUNICATION SYSTEM AND INFORMATION SYSTEM FOR A MOTOR VEHICLE

CROSS-REFERENCE TO RELATED APPLICATIONS

This application claims the benefit of U.S. Provisional Application No. 60/557,950, filed on Mar. 31, 2004, which is expressly incorporated herein in its entirety by reference thereto.

FIELD OF THE INVENTION

The present invention relates to a communication system or information system for a motor vehicle, the communication system or information system, e.g., having an interface for the exchange of data between the communication system and a mobile telephone, or for the exchange of data between the information system and a mobile data memory or a mobile computer.

BACKGROUND INFORMATION

German Published Patent Application No. 203 10 288 describes a hands-free conversing device for mobile telephones in a motor vehicle, which includes a holding receptacle to be permanently placed in the motor vehicle. On one side, this holding receptacle is to be electrically connected to an electronics unit installed in the vehicle and connected to a corresponding vehicle interface, and on the other side, it has a plug connector for the electrical and mechanical connection to telephone holders adapted to different mobile telephones, a Bluetooth adapter with an integrated plug connector being provided for the electrical and mechanical coupling to the plug connector of the holding device.

German Published Patent Application No. 198 35 433 describes a communication terminal or telephone, in particular for Internet telephony, which has a touch-sensitive display as input/output interface and means for displaying an HTML-like page on the display via which the functions of the terminal are able to be operated. The telephone includes a freely configurable operating surface. To this end, the telephone has a touch-sensitive display and an Internet browser to process so-called HTML pages. The display is used as input and output interface for a user. The Internet browser or www-browser may be called a conversion device or an interpreter of HTML pages. In addition to text, control characters that may lead to other pages or trigger functions are also representable on the HTML page. The browser function may run in the telephone on an already available processor or on an additional processor. In an analogous manner, the HTML page is able to be stored in the telephone. Via the HTML page, the operating surface of the telephone may be freely configured by any provider of telecommunication services. The browser represents this specific operating surface on the telephone. The HTML page may be supplemented by Java applets or corresponding technologies. The provider loads the HTML pages into the telephone or terminal via the Internet protocol, for instance. The terminal is usable, for example, only after the user surface has been imported by the operator of the provider.

U.S. Pat. No. 5,619,684 describes the display of numerical keys and function keys for a telephone on a display disposed below a touch screen is known.

SUMMARY

Example embodiments of the present invention may improve the operability of a communication system or information system for a vehicle, the system including an interface for the exchange of data between the communication system and a mobile telephone, or for the exchange of data between the information system and a mobile data memory or a mobile computer.

An example embodiment of the present invention may provide a communication system for a motor vehicle, the communication system including an interface for the exchange of data between the communication system and a mobile telephone; a display having an associated control device to display an image of the mobile telephone, the image including at least one operating element, or a portion of an image of the mobile telephone, the image including at least one operating element; and a touch screen disposed above the display, to operate the mobile telephone by touching the touch screen in the region of the displayed operating element or by pressing on the touch screen in the region of the displayed operating element. In this manner, an operator who is familiar with operating the mobile telephone is able to operate it with the aid of the touch screen in the same manner as when using the operating elements of the mobile telephone. There is no need for the operator to adjust to a new man-machine interface. Instead, he may operate the mobile telephone also via the operating elements operable with the aid of the touch screen, in a manner with which the user is familiar.

An upper portion of the mobile telephone may be able to be displayed on the display next to a lower portion of the mobile telephone.

Information about the image of the mobile telephone or the portion of the image of the mobile telephone in XML format may be able to be used (by the control device) for display on the display. Details regarding the display of images stored in XML format may be gathered from U.S. Pat. No. 6,640,169 (incorporated by reference), U.S. Patent Application Publication No. 2003/0120397 (incorporated by reference), U.S. Patent Application Publication No. 2002/0138178 (incorporated by reference) and European Published Patent Application No. 1 245 430.

Information about the image of the mobile telephone or the portion of the image of the mobile telephone may be able to be transmitted from the mobile telephone to the communication system, it being possible to read the information about the image of the mobile telephone or the portion of the image of the mobile telephone in to the communication system, e.g., via the interface.

The communication system may also include an information memory to store information about the image of the mobile telephone or the portion of the image of the mobile telephone. The communication system may also include an identification module to identify the type of the mobile telephone and, e.g., a selection module to select information about the image of the mobile telephone or the portion of the image of the mobile telephone as a function of the identified type of the mobile telephone.

The interface may be an interface for wireless communication, e.g., a Bluetooth interface.

In a method for operating a communication system for a motor vehicle, a data link between the communication system and a mobile telephone is established via a previously mentioned interface, e.g., and an image, including at least one operating element, of the mobile telephone or a portion of an image, including at least one operating element, of the mobile telephone is displayed on a display. For example, the mobile telephone may be operated by touching a touch screen, disposed above the display, in the region of the displayed operating element, or by pressing on the touch screen in the region of the displayed operating element.

Information about the image of the mobile telephone or the portion of the image of the mobile telephone may be transmitted from the mobile telephone to the communication system, e.g., prior to display of the image, including at least one operating element, of the mobile telephone, or the portion of the image, including at least one operating element, of the mobile telephone on the display. This transmission is implemented in a wireless manner, for example.

The type of the mobile telephone may be identified, and information about the image of the mobile telephone or the portion of the image of the mobile telephone may be selected from an information memory as a function of the identified type of the mobile telephone. Information about at least one image of at least two mobile telephones in each case, or at least one portion of at least one image of at least two mobile telephones in each case may be able to be stored, or may be stored, in the information memory.

In an information system for a motor vehicle, the information system includes an interface for the exchange of data between the information system and a mobile data memory, e.g., a PDA, and/or a mobile computer; a display having an assigned control system to display an image of the mobile data memory and/or the mobile computer, the image including at least one operating element, or a portion of the image of the mobile data memory and/or the mobile computer, the image including at least one operating element; and a touch screen disposed above the display to operate the mobile data memory and/or the mobile computer by touching the touch screen in the region of the displayed operating element or by pressing on the touch screen in the region of the displayed operating element. In this manner, an operator who is familiar with operating the mobile data memory and/or the mobile computer is able to operate it via the touch screen in the same manner as when using the operating elements of the mobile data memory and/or the mobile computer. There is no need for the operator to adjust to a new man-machine interface. Instead, he may operate the mobile data memory and/or the mobile computer in the familiar manner also via the operating elements operable with the aid of the touch screen.

An upper portion of the mobile data memory and/or the mobile computer may be displayable on the display next to a lower portion of the mobile data memory and/or the mobile computer.

The control system may be able to use information about the image of the mobile data memory and/or the mobile computer, or the portion of the image of the mobile data memory and/or the mobile computer in XML format for display on the display. Details regarding the display of images stored in XML format may be gathered from U.S. Pat. No. 6,640,169 (incorporated by reference), U.S. Patent Application Publication No. 2003/0120397 (incorporated by reference), U.S. Patent Application Publication No. 2002/0138178 (incorporated by reference) and European Published Patent Application No. 1 245 430.

Information about the image of the mobile data memory and/or the mobile computer, or the portion of the image of the mobile data memory and/or the mobile computer may be able to be transmitted from the mobile data memory and/or the mobile computer to the information system, it being possible to read the information about the image of the mobile data memory and/or the mobile computer, or the portion of the image of the mobile data memory and/or the mobile computer, in to the information system via the interface, for example.

The information system may also include an information memory to store information about the image of the mobile data memory and/or the mobile computer, or the portion of the image of the mobile data memory and/or the mobile computer. The information system may also include an identification module to identify the type of the mobile data memory and/or the mobile computer, and, for example, a selection module to select information about the image of the mobile data memory and/or the mobile computer, or the portion of the image of the mobile data memory and/or the mobile computer as a function of the identified type of the mobile data memory and/or the mobile computer.

The interface may be an interface for wireless communication, e.g., a Bluetooth interface.

In a method for operating an information system for a motor vehicle, a data link is established between the information system and a mobile data memory and/or a mobile computer, e.g., via a previously mentioned interface; and an image, including at least one operating element, of the mobile data memory and/or the mobile computer, or a portion of an image, including at least one operating element, of the mobile data memory and/or the mobile computer is displayed on a display. For example, the mobile data memory and/or the mobile computer may be operated by touching a touch screen, disposed above the display, in the region of the displayed operating element, or by pressing on the touch screen in the region of the displayed operating element.

Information about the image of the mobile data memory and/or the mobile computer, or the portion of the image of the mobile data memory and/or the mobile computer may be transmitted from the mobile data memory and/or the mobile computer to the information system, e.g., prior to the display of the image, including at least one operating element, of the mobile data memory and/or the mobile computer, or the portion of the image, including at least one operating element, of the mobile data memory and/or the mobile computer on the display. This transmission is implemented in a wireless manner, for example.

The type of the mobile data memory and/or the mobile computer may be identified; and information about the image of the mobile data memory and/or the mobile computer, or the portion of the image of the mobile data memory and/or the mobile computer may be selected from an information memory as a function of the identified type of the mobile data memory and/or the mobile computer; it being possible to store information about at least one image of at least two mobile telephones, mobile data memories and/or mobile computers in each case, or at least one portion of at least one image of at least two mobile telephones, mobile data memories and/or mobile computers in each case in the information memory.

A motor vehicle includes an interface for the exchange of data between the information system and a mobile telephone, a mobile data memory, e.g., a PDA, and/or a mobile computer; a display having an assigned control system to display an image, including at least one operating element, of the mobile telephone, the mobile data memory and/or the mobile computer, or a portion of an image, including at least one operating element, of the mobile telephone, the mobile data memory and/or the mobile computer; and a touch screen, disposed above the display, to operate the mobile telephone, the mobile data memory and/or the mobile computer by touching the touch screen in the region of the displayed operating element, or by pressing on the touch screen in the region of the displayed operating element.

A motor vehicle may include a land vehicle that may be used individually in road traffic. Motor vehicles are not restricted to land vehicles having an internal combustion engine.

Further aspects and details of exemplary embodiments of the present invention are described below with reference to the appended Figures.

DETAILED DESCRIPTION

Figure 1:
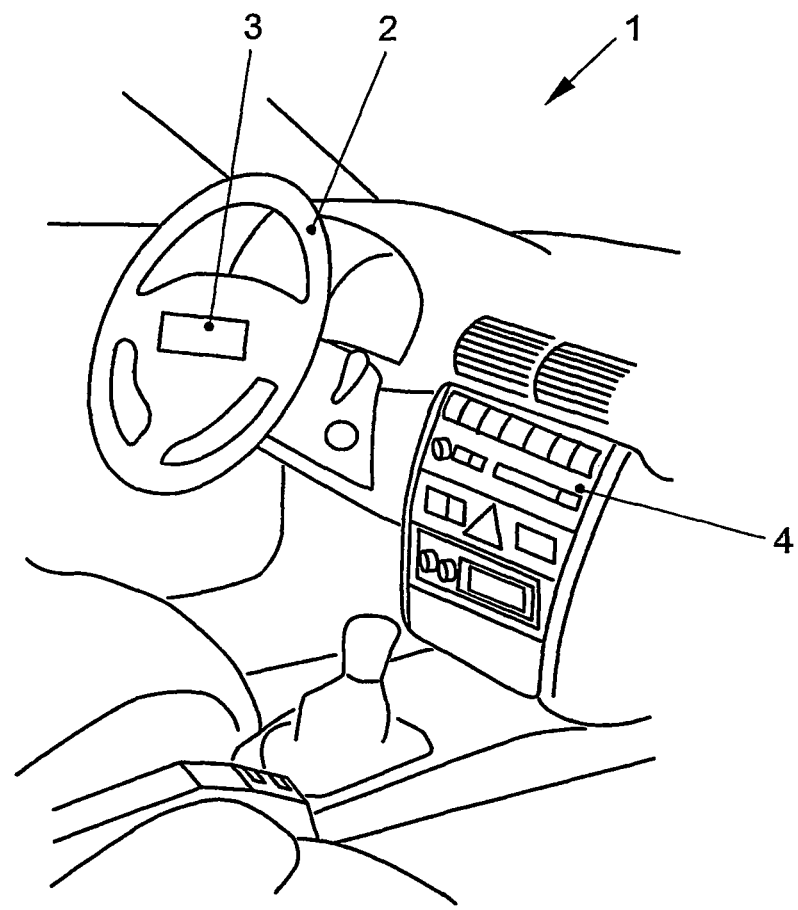
FIG. 1 is a view of the interior of a motor vehicle.

FIG. 1 is a view of the interior of a motor vehicle 1. Motor vehicle 1 has a steering wheel 2 into which a display device 3 is integrated. However, as an alternative, display device 3 may also be arranged in an instrument panel 4, or be arranged in an instrument panel 4 as additional display device.

Figure 2:
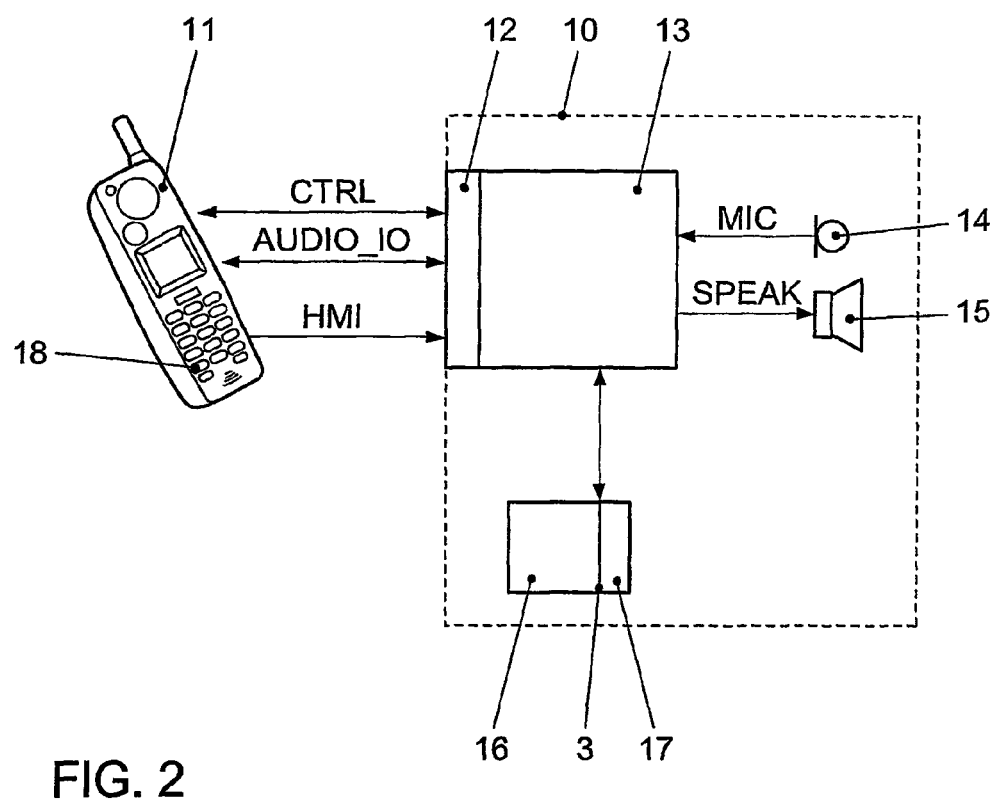
FIG. 2 illustrates an exemplary embodiment of a communication system.

Furthermore, motor vehicle 1 includes a communication system 10, illustrated in FIG. 2, which has a control system 13 that includes a Bluetooth interface 12 for the exchange of data CTRL, AUDIO_IO, HMI between communication system 10 and a mobile telephone 11. In addition, communication system 10 includes a microphone 14, which generates a signal MIC, and a loudspeaker 15 to output a loudspeaker signal SPEAK. Control system 13 together with microphone 14 and loudspeaker 15 forms a hands-free telephone device for mobile telephone 11. Signal MIC and loudspeaker signal SPEAK are transmitted as audio input and audio output signal AUDIO_IO between control system 13 and mobile telephone 11 via Bluetooth interface 12. This data exchange is controlled by a control signal CTRL. Microphone 14 and loudspeaker 15 may also be part of another system such as a music system.

Furthermore, communication system 10 has display device 3, which is able to be utilized by other components as well, for instance, a climate-control device, an infotainment system or a navigation system. Such a display device is described in PCT International Published Patent Application No. WO 00/21795, for example. Display device 3 includes a display 16 to display an image, including at least one operating element, of mobile telephone 11, or a portion of an image, including at least one operating element, of mobile telephone 11; as well as a touch screen 17, disposed above display 16, to operate mobile telephone 11 by touching touch screen 17 in the region of the displayed operating element and/or by pressing on touch screen 17 in the region of the displayed operating element. To this end, an information item HMI about the image of mobile telephone 11 or the portion of the image of mobile telephone 11 is transmitted from mobile telephone 11 to communication system 10 and/or control system 13 in XML format via Bluetooth interface 12. Table 1 shows an exemplary embodiment for such information HMI in XML format. Details regarding the display of images in XML format may be gathered from U.S. Pat. No. 6,640,169 (incorporated by reference), U.S. Patent Application Publication No. 2003/0120397 (incorporated by reference), U.S. Patent Application Publication No. 2002/0138178 (incorporated by reference) and European Published Patent Application No. 1 245 430.

TABLE 1

```
<device name="Motorola 280i">
  <panel name="defaultScreen">
    <label name="batteryLevel"/>
    <button name="phoneBook"/>
    <button name="message"/>
  </panel>
  <panel name="phoneBook">
  ...
</device>
```

Figure 3:
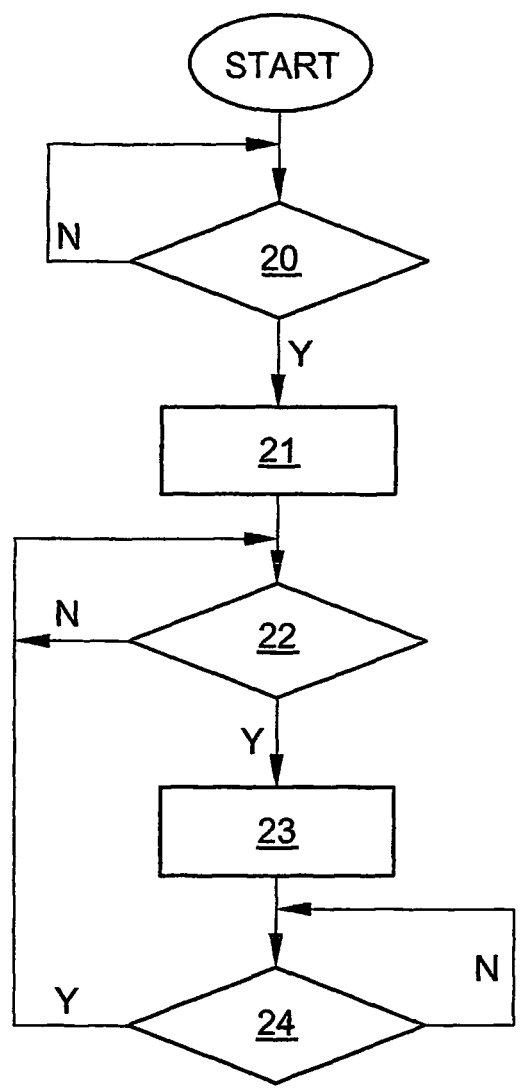
FIG. 3 illustrates a method sequence implemented in a communication system.

FIG. 3 illustrates a method sequence, implemented in control system 13 and thus in communication system 10, for displaying the image of mobile telephone 11 or a portion of the image of mobile telephone 11. To this end, it is first queried via a query 20 whether a data link is to be established between a mobile telephone and control system 13. If a data link is to be established between a mobile telephone, such as mobile telephone 11 and control device 13, query 20 is followed by a step 21 in which an information item HMI with regard to the image of this mobile telephone 11, or the portion of the image of this mobile telephone 11, is transmitted from this mobile telephone 11 to communication system 10 or control system 13 in XML format via Bluetooth interface 12. Otherwise, query 20 is followed by another query 20.

If display device 3 is utilized by other functions as well, such as an air-conditioning system, an infotainment system or a navigation system, step 21 is followed by a query 22 as to whether mobile telephone 11 is to be operated with the aid of display device 3 or with the aid of touch screen 17. Otherwise, step 21 is followed by a step 23 in which an image of mobile telephone 11, or the portion of the image of mobile telephone 11, is displayed on display 16. If mobile telephone 11 is to be operated with the aid of display device 3 or with the aid of touch screen 17, query 22 is followed by step 23. Otherwise, query 22 is followed by another query 22.

If display device 3 is utilized by other functions as well, such as an air-conditioning system, an infotainment system or a navigation system, step 23 is followed by a query 24 as to whether the operation of mobile telephone 11 with the aid of display device 3 or with the aid of touch screen 17 is to be ended. Otherwise, step 23 is followed by query 22. If the operation of mobile telephone 11 with the aid of display device 3 or with the aid of touch screen 17 is to be ended, query 24 is followed by query 22. Otherwise, query 24 is followed by another query 24.

Figure 4:
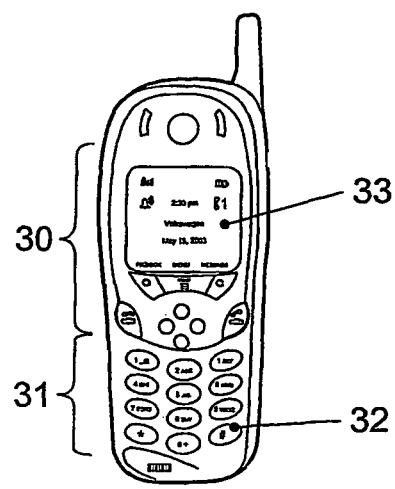
FIG. 4 illustrates an exemplary embodiment of a mobile telephone.
Figure 5:
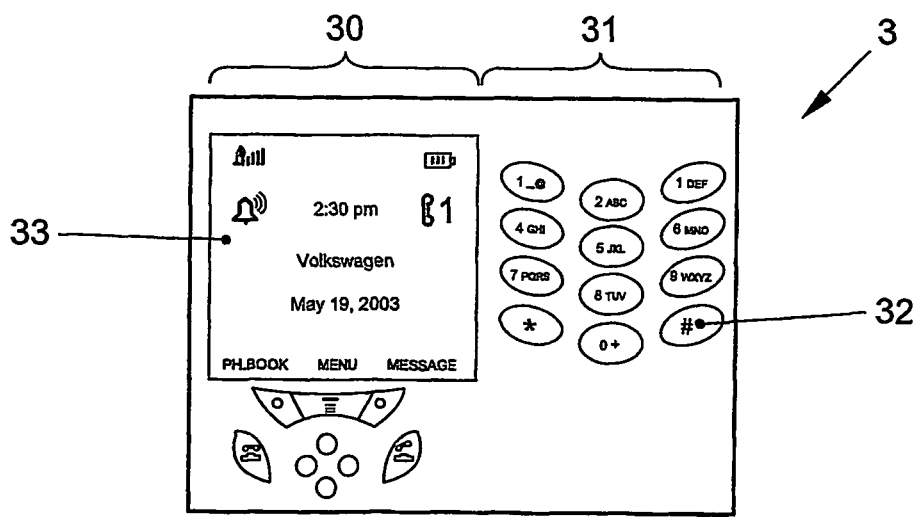
FIG. 5 illustrates an exemplary embodiment of a display of an image of the mobile telephone illustrated in FIG. 4.
Figure 6:
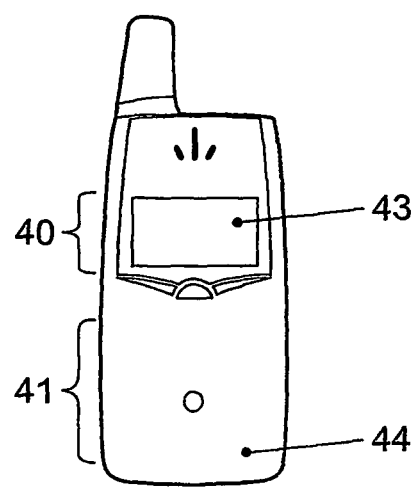
FIG. 6 illustrates an exemplary embodiment of a mobile telephone.
Figure 7:
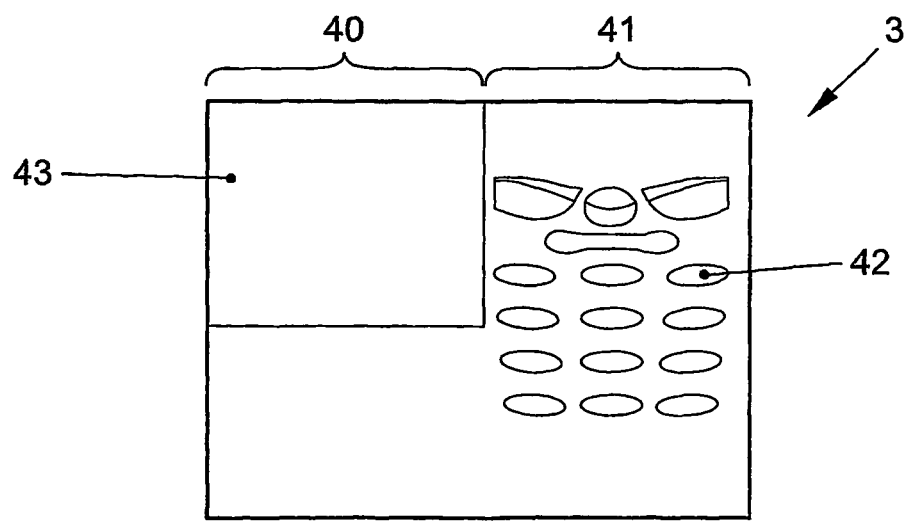
FIG. 7 illustrates an exemplary embodiment of a display of an image of the mobile telephone illustrated in FIG. 6.

FIG. 4 and FIG. 6 each illustrate an exemplary embodiment of a mobile telephone, and FIG. 5 and FIG. 7 illustrate an exemplary embodiment of a display of an image of these mobile telephones illustrated in FIG. 4 and FIG. 6. FIG. 4 illustrates a Motorola 280i, and FIG. 5 illustrates an image of a Motorola 280i displayed with the aid of display device 3. An upper portion 30 of the Motorola 280i is illustrated next to a lower portion 31 of the Motorola 280i. By touching display device 3 or touch screen 17 in the region of displayed operating elements 32, or by pressing on display device 3 or touch screen 17 in the region of displayed operating elements 32, an operator who is familiar with operating the Motorola 280i is able to operate it via display device 3 or touch screen 17 in the same manner as the Motorola 280i illustrated in FIG. 4. It may be provided that a telephone display 33 is able to be displayed via display device 3 as well. In this context, it may be provided that information represented on telephone display 33, displayed with the aid of display device 3, is displayed in the same manner as when using the same operation on actual telephone display 33 of the Motorola 280i.

If the Motorola 280i in motor vehicle 1 is exchanged for an Ericsson T39m, illustrated in FIG. 6, display device 3 displays an image of the Ericsson T39m instead of the Motorola 280i, as illustrated in FIG. 7. An upper portion 40 of the Ericsson T39m is displayed next to a lower portion 41 of the Ericsson T39m lying underneath a cover 44.

By touching display device 3 or touch screen 17 in the region of displayed operating elements 42, which are arranged underneath the cover in the Ericsson T39m, or by pressing on display device 3 or touch screen 17 in the region of displayed operating elements 42 situated arranged underneath cover 44 in the Ericsson T39m, an operator who is familiar with operating the Ericsson T39m is able to operate it via display device 3 or touch screen 17 in the same manner as the actual Ericsson T39m illustrated in FIG. 6. It may be provided that a telephone display 43 is also able to be imaged with the aid of display device 3. In this context, it may be provided that information is displayed on telephone display 43, displayed with the aid of display device 3, in the same manner as when using the same operation on actual telephone display 43 of the Ericsson T39m.

Figure 8:
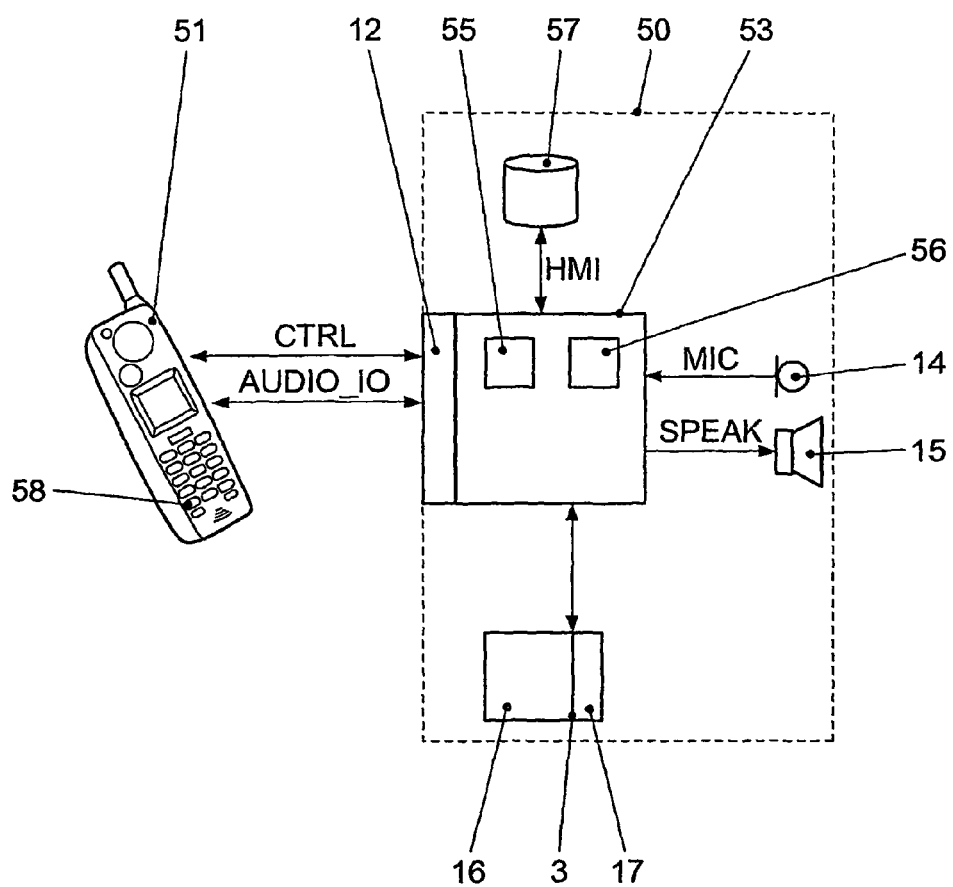
FIG. 8 illustrates an exemplary embodiment of a communication system.

FIG. 8 illustrates a communication system 50 as an alternative to communication system 10 illustrated in FIG. 2, identical reference numerals denoting identical or similar subject matters as those illustrated in FIG. 2. Like communication system 10 illustrated in FIG. 2, communication system 50 illustrated in FIG. 8 has a Bluetooth interface 12 for the exchange of data CTRL, AUDIO_IO between a communication system 50 having a control system 53, and a mobile telephone 51. Furthermore, communication system 50 includes a microphone 14, which generates a signal MIC, and a loudspeaker 15 to output a loudspeaker signal SPEAK. Control system 53 together with microphone 14 and loudspeaker 15 forms a hands-free telephone device for mobile telephone 51. Signal MIC and loudspeaker signal SPEAK are transmitted as audio input and audio output signal AUDIO_IO between control system 53 and mobile telephone 51 via Bluetooth interface 12. This data exchange is controlled by a control signal CTRL. Microphone 14 and loudspeaker 15 may also be part of another system such as a music system.

Furthermore, communication system 50 has display device 3, which is able to be utilized by other components as well, for instance, a climate-control device, an infotainment system or a navigation system. Display device 3 includes a display 16 to display, as shown in FIG. 4 and FIG. 6, for example, an image, including at least one operating element 58, of mobile telephone 51, or a portion of an image, including at least one operating element 58, of mobile telephone 51; as well as a touch screen 17, disposed above display 16, to operate mobile telephone 51 by touching touch screen 17 in the region of displayed operating element 58, and/or by pressing on touch screen 17 in the region of displayed operating element 58. Furthermore, communication system 50 includes an information memory 57 to store an information item HMI about the image of mobile telephone 51 or the portion of the image of mobile telephone 51.

Figure 9:
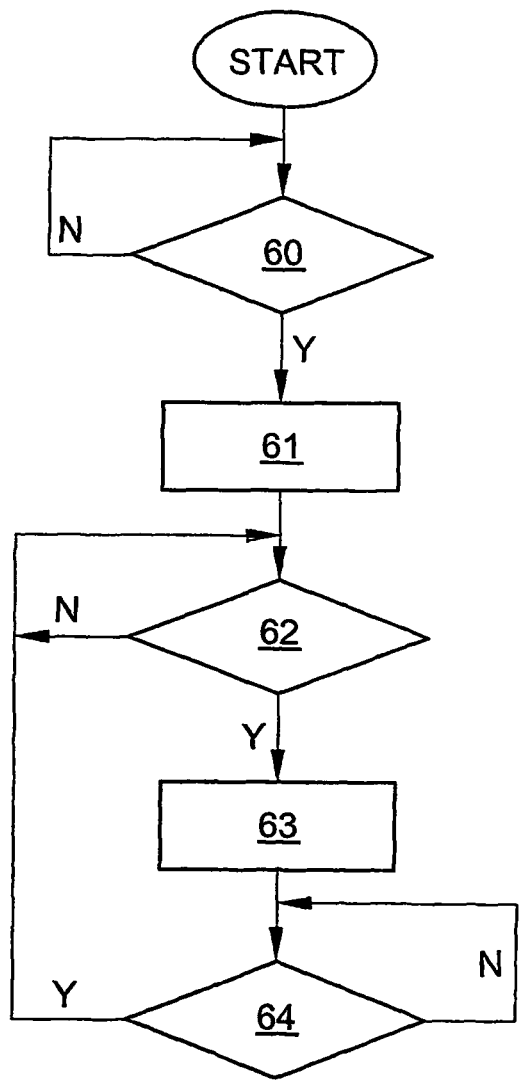
FIG. 9 illustrates a method sequence implemented in a communication system.

To display an image, including at least one operating element 58, of mobile telephone 51, or a portion of an image, including at least one operating element 58, of mobile telephone 51, a method sequence as illustrated in FIG. 9 is implemented in control system 53. To this end, it is first queried via a query 60 whether a data link is to be established between a mobile telephone and control system 53.

If a data link is to be established between a mobile telephone such as mobile telephone 51, and control system 53, query 60 is followed by a step 61 to identify the type of mobile telephone 51, for instance, Motorola 280i or Ericsson T39m, with the aid of an identification module 55 illustrated in FIG. 8, and to select an information item HMI in XML format about the image of mobile telephone 51, or the portion of the image of mobile telephone 51, from information memory 57 as a function of the identified type of mobile telephone 51, with the aid of a selection module 56 illustrated in FIG. 8. Otherwise, query 60 will be implemented again.

If display device 3 is utilized by other functions as well, such as an air-conditioning system, an infotainment system or a navigation system, step 61 is followed by a query 62 as to whether mobile telephone 51 is to be operated with the aid of display device 3 or with the aid of touch screen 17. Otherwise, step 61 is followed by a step 63 in which an image of mobile telephone 5, or the portion of the image of mobile telephone 51 is displayed on display 16. If mobile telephone 51 is to be operated with the aid of display device 3 or with the aid of touch screen 17, query 62 is followed by step 63. Otherwise, query 62 is followed by another query 62.

If display device 3 is utilized by other functions as well, such as an air-conditioning system, an infotainment system or a navigation system, step 63 is followed by a query 64 as to whether the operation of mobile telephone 51 with the aid of display device 3 or with the aid of touch screen 17 is to be ended. Otherwise, step 63 is followed by query 62. If the operation of mobile telephone 51 with the aid of display device 3 or with the aid of touch screen 17 is to be ended, query 64 is followed by query 62. Otherwise, query 64 is followed by another query 64.

It may be provided that communication system 10 illustrated in FIG. 2, and communication system 50 illustrated in FIG. 8, are also usable or alternatively usable together with a mobile data memory, e.g., a PDA and/or a mobile computer. In this instance, reference numerals 10 and 50 denote an information system. Such an information system 10 or 50, provided it is not also able to be used in connection with a mobile telephone, generally has neither microphone 14 nor loudspeaker 15.

Figure 10:
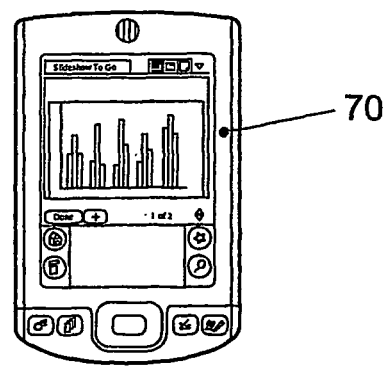
FIG. 10 illustrates an exemplary embodiment of a mobile data memory and computer.
Figure 11:
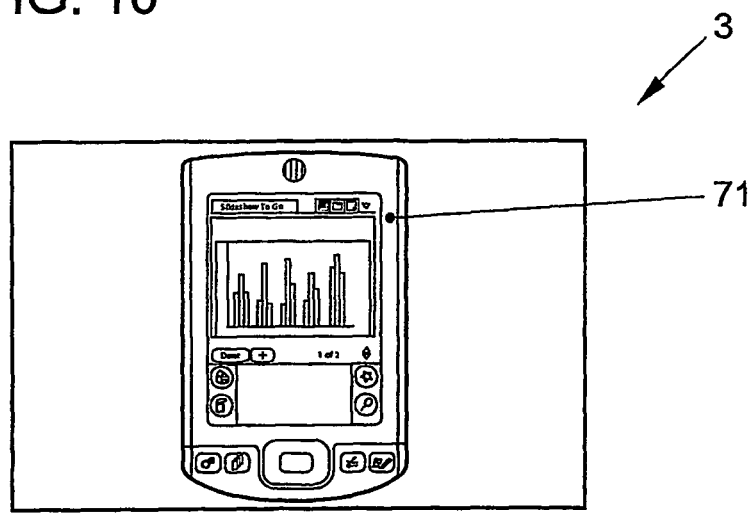
FIG. 11 illustrates an exemplary embodiment of a display of an image of the data memory and computer illustrated in FIG. 10.

FIG. 10 illustrates a PALM Tungsten E, denoted by reference numeral 70, as an exemplary embodiment of a mobile data memory and computer. As illustrated in FIG. 11, its image 71 is displayable in a similar manner as described with reference to mobile telephones Motorola 280i or Ericsson T39m in order to operate the PALM Tungsten E with the aid of display device 3. In an alternative arrangement, an upper portion of the PALM Tungsten E is displayable on the display next to a lower portion of the PALM Tungsten E.

Figure 12:
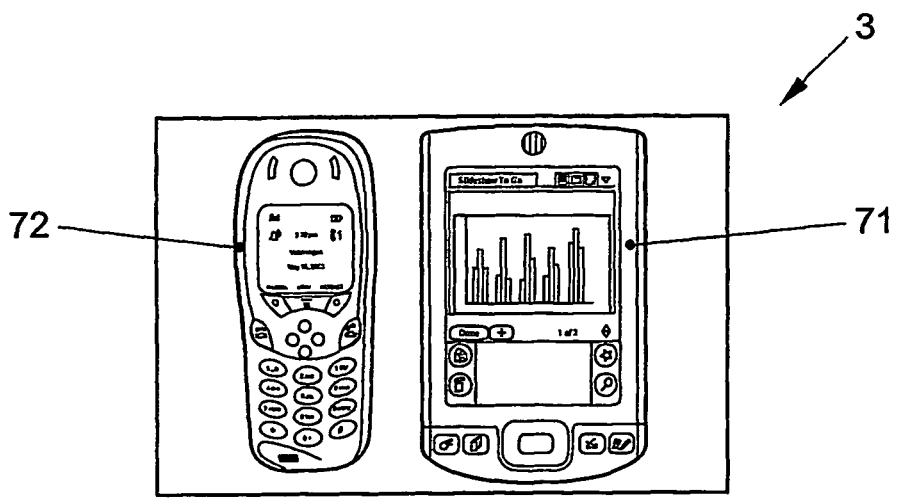
FIG. 12 illustrates an exemplary embodiment of a display of an image of the mobile telephone illustrated in FIG. 4, and an image of the data memory and computer illustrated in FIG. 10.

It may be provided that communication system 10 illustrated in FIG. 2, and communication system 50 illustrated in FIG. 8 are also able to be used together with a mobile data memory, e.g., a PDA and/or a mobile computer. In this instance, it may be provided that a mobile telephone and the mobile data memory or mobile computer as illustrated in FIG. 12 are able to be displayed and operated simultaneously with the aid of display device 3. For instance, FIG. 12 illustrates the simultaneous display of an image 72 of a Motorola 280i and an image 71 of a PALM Tungsten E.

Control systems 13 and 53 may be implemented on a MGT5100 hardware platform, for example.

LIST OF REFERENCE CHARACTERS 1 motor vehicle
2 steering wheel
3 display device
4 instrument panel
10, 50 communication system
11, 51 mobile telephone
12 interface
13, 53 control system
14 microphone
15 loudspeaker
16 display
17 touch screen
18, 32, 42, 58 operating element
20, 22, 24, 60, 62, 64 query
21, 23, 61, 63 step
30, 40 upper portion
31, 41 lower portion
33, 43 telephone display
44 cover
55 identification module
56 selection module
57 information memory
70 PALM Tungsten E
71, 72 image
AUDIO_IO audio input and audio output signal
CTRL control signal
HMI information
MIC signal
SPEAK loudspeaker signal

What is claimed is:

1. A communication system for a motor vehicle, comprising:
    an interface adapted to exchange data between the communication system and at least one of (a) a mobile telephone, (b) a mobile data memory or (c) a mobile computer, the communication system being positioned in the motor vehicle;
    a display including an assigned control system adapted to simultaneously display at least two of (a) an image, including at least one operating element, of at least one of (a) the mobile telephone, (b) the mobile data memory or (c) the mobile computer or (b) a portion of the image, including at least one operating element, of at least one of (a) the mobile telephone, (b) the mobile data memory or (c) the mobile computer on the display such that the at least one operating element of the at least two of (a) the image or (b) the portion of the image are simultaneously operable via the display; and
    a touch screen, arranged above the display, adapted to operate at least one of (a) the mobile telephone, (b) the mobile data memory or (c) the mobile computer by at least one of (a) touch of the touch screen in a region of the displayed operating element or (b) press on the touch screen in the region of the displayed operating element;
    wherein the display of the communication system is also utilized by at least one of a climate-control device, an infotainment system, and/or a navigation system of the motor vehicle; and
    wherein the control system is adapted to query whether the at least one of (a) the mobile telephone, (b) the mobile data memory, or (c) the mobile computer is to be operated by the display or the touch screen when the display is utilized by the at least one of the climate-control device, the infotainment system, and/or the navigation system of the motor vehicle;
    wherein the control system is further adapted, based on a result of the query, to determine whether the display is to continue to show the at least one of the climate-control device, the infotainment system, and/or the navigation system of the motor vehicle, or the display is to show the display of the at least two of (a) an image, including at least one operating element, of at least one of (a) the mobile telephone, (b) the mobile data memory or (c) the mobile computer or (b) a portion of the image, including at least one operating element, of at least one of (a) the mobile telephone, (b) the mobile data memory or (c) the mobile computer.

2. The communication system according to claim 1, wherein the display is adapted to use information about at least one of (a) the image of the mobile telephone or (b) the portion of the image of the mobile telephone in XML format.

3. The communication system according to claim 1, wherein the mobile telephone is adapted to transmit to the communication system information about at least one of (a) the image of the mobile telephone or (b) the portion of the image of the mobile telephone.

4. The communication system according to claim 3, wherein the interface is adapted to read in to the communication system the information about at least one of (a) the image of the mobile telephone or (b) the portion of the image of the mobile telephone.

5. The communication system according to claim 1, further comprising an information memory adapted to store information about at least one of (a) the image of the mobile telephone or (b) the portion of the image of the mobile telephone.

6. The communication system according to claim 5, further comprising an identification module adapted to identify a type of the mobile telephone.

7. The communication system according to claim 6, further comprising a selection module adapted to select information about at least one of (a) the image of the mobile telephone or (b) the portion of the image of the mobile telephone as a function of the identified type of the mobile telephone.

8. The communication system according to claim 1, wherein the interface is arranged as an interface for wireless communication.

9. The communication system according to claim 8, wherein the interface includes a Bluetooth interface for wireless communication.

10. A method for operating a communication system for a motor vehicle, comprising:
    establishing a data link between the communication system and at least one of (a) a mobile telephone, (b) a mobile data memory or (c) a mobile computer, the communication being positioned in the motor vehicle; and
    simultaneously displaying at least two of (a) an image, including at least one operating element, of at least one of (a) the mobile telephone, (b) the mobile data memory or (c) the mobile computer or (b) a portion of an image, including at least one operating element, of at least one of (a) the mobile telephone, (b) the mobile data memory or (c) the mobile computer, on a display such that the at least one operating element of the at least two of (a) the image or (b) the portion of the image are simultaneously operable via the display;

wherein the display of the communication system is also utilized by at least one of a climate-control device, an infotainment system, and/or a navigation system of the motor vehicle; and wherein the control system is adapted to query whether the at least one of (a) the mobile telephone, (b) the mobile data memory, or (c) the mobile computer is to be operated by the display or the touch screen when the display is utilized by the at least one of the climate-control device, the infotainment system, and/or the navigation system of the motor vehicle;

wherein the control system is further adapted, based on a result of the query, to determine whether the display is to continue to show the at least one of the climate-control device, the infotainment system, and/or the navigation system of the motor vehicle, or the display is to show the display of the at least two of (a) an image, including at least one operating element, of at least one of (a) the mobile telephone, (b) the mobile data memory or (c) the mobile computer or (b) a portion of the image, including at least one operating element, of at least one of (a) the mobile telephone, (b) the mobile data memory or (c) the mobile computer.

11. The method according to claim 10, further comprising operating the mobile telephone by at least one of (a) touching a touch screen, disposed above the display, in a region of the displayed operating element or (b) pressing on the touch screen in the region of the displayed operating element.

12. The method according to claim 10, further comprising transmitting information about at least one of (a) the image of the mobile telephone or (b) the portion of the image of the mobile telephone from the mobile telephone to the communication system.

13. The method according to claim 10, further comprising identifying a type of the mobile telephone.

14. The method according to claim 10, further comprising selecting information about at least one of (a) the image of the mobile telephone or (b) the portion of the image of the mobile telephone on an information memory as a function of the identified type of the mobile telephone, the information memory adapted to store information about at least one of (a) at least one image of at least two mobile telephones or (b) at least one portion of at least one image of at least two mobile telephones.

15. An information system for a motor vehicle, comprising:
an interface adapted to exchange data between the information system and at least one of (a) a mobile telephone, (b) a mobile data memory or (c) a mobile computer, the information system being positioned in the motor vehicle;
a display including an assigned control system adapted to simultaneously display at least two of (a) an image, including at least one operating element, of at least one of (a) the mobile telephone, (b) the mobile data memory or (c) the mobile computer, or (b) a portion of an image, including at least one operating element, of at least one of (a) the mobile telephone, (b) the mobile data memory or (c) the mobile computer on the display such that the at least one operating element of the at least two of (a) the image or (b) the portion of the image are simultaneously operable via the display; and
a touch screen, disposed above the display, adapted to operate at least one of (a) the mobile telephone, (b) the mobile data memory or (c) the mobile computer by at least one of (a) touch of the touch screen in a region of the displayed operating element or (b) press on the touch screen in the region of the displayed operating element;
wherein the display of the information system is also utilized by at least one of a climate-control device, an infotainment system, and/or a navigation system of the motor vehicle; and
wherein the control system is adapted to query whether the at least one of (a) the mobile telephone, (b) the mobile data memory, or (c) the mobile computer is to be operated by the display or the touch screen when the display is utilized by the at least one of the climate-control device, the infotainment system, and/or the navigation system of the motor vehicle;
wherein the control system is further adapted, based on a result of the query, to determine whether the display is to continue to show the at least one of the climate-control device, the infotainment system, and/or the navigation system of the motor vehicle, or the display is to show the display of the at least two of (a) an image, including at least one operating element, of at least one of (a) the mobile telephone, (b) the mobile data memory or (c) the mobile computer or (b) a portion of the image, including at least one operating element, of at least one of (a) the mobile telephone, (b) the mobile data memory or (c) the mobile computer.

16. The information system according to claim 15, wherein the display is adapted to use information about at least one of (a) the image of at least one of (a) the mobile data memory or (b) the mobile computer or (b) the portion of the image of at least one of (a) the mobile data memory or (b) the mobile computer in XML format.

17. The information system according to claim 15, wherein at least one of (a) the mobile data memory or (b) the mobile computer is adapted to transmit to the information system information about at least one of (a) the image of at least one of (a) the mobile data memory or (b) the mobile computer or (b) the portion of the image of at least one of (a) the mobile data memory or (b) the mobile computer.

18. The information system according to claim 17, wherein the interface is adapted to read in to the information system the information about at least one of (a) the image of at least one of (a) the mobile data memory or (b) the mobile computer or (b) the portion of the image of at least one of (a) the mobile data memory or (b) the mobile computer.

19. The information system according to claim 15, further comprising an information memory adapted to store information about at least one of (a) the image of at least one of (a) the mobile data memory or (b) the mobile computer or (b) the portion of the image of at least one of (a) the mobile data memory or (b) the mobile computer.

20. The information system according to claim 19, further comprising an identification module adapted to identify a type of at least one of (a) the mobile data memory or (b) the mobile computer.

21. The information system according to claim 20, further comprising a selection module adapted to select information about at least one of (a) the image of at least one of (a) the mobile data memory or (b) the mobile computer or (b) the portion of the image of at least one of (a) the mobile data memory or (b) the mobile computer, as a function of the identified type of the mobile data memory or the mobile computer.

22. The information system according to claim 15, wherein the interface includes an interface for wireless communication.

23. The information system according to claim 22, wherein the interface includes a Bluetooth interface for wireless communication.

24. The information system according to claim 15, wherein the mobile data memory includes a PDA.

25. A method for operating an information system for a motor vehicle, comprising:
- establishing a data link between the information system and at least one of (a) a mobile telephone, (b) a mobile data memory or (c) a mobile computer, the information system being positioned in the motor vehicle; and
- simultaneously displaying at least two of (a) an image, including at least one operating element, of at least one of (a) the mobile telephone, (b) the mobile data memory or (c) the mobile computer, or (b) a portion of an image, including at least one operating element, of at least one of (a) the mobile telephone, (b) the mobile data memory or (c) the mobile computer on a display such that the at least one operating element of the at least two of (a) the image or (b) the portion of the image are simultaneously operable via the display;
- wherein the display of the communication system is also utilized by at least one of a climate-control device, an infotainment system, and/or a navigation system of the motor vehicle; and
- wherein the control system is adapted to query whether the at least one of (a) the mobile telephone, (b) the mobile data memory, or (c) the mobile computer is to be operated by the display or the touch screen when the display is utilized by the at least one of the climate-control device, the infotainment system, and/or the navigation system of the motor vehicle;
- wherein the control system is further adapted, based on a result of the query, to determine whether the display is to continue to show the at least one of the climate-control device, the infotainment system, and/or the navigation system of the motor vehicle, or the display is to show the display of the at least two of (a) an image, including at least one operating element, of at least one of (a) the mobile telephone, (b) the mobile data memory or (c) the mobile computer or (b) a portion of the image, including at least one operating element, of at least one of (a) the mobile telephone, (b) the mobile data memory or (c) the mobile computer.

26. The method according to claim 25, further comprising: operating at least one of (a) the mobile data memory or (b) the mobile computer by at least one of (a) touching a touch screen, disposed above the display, in a region of the displayed operating element or (b) pressing on the touch screen in the region of the displayed operating element.

27. The method according to claim 25, further comprising transmitting information about at least one of (a) the image of at least one of (a) the mobile data memory or (b) the mobile computer or (b) the portion of the image of at least one of (a) the mobile data memory or (b) the mobile computer from at least one of (a) the mobile data memory or (b) the mobile computer to the information system.

28. The method according to claim 25, further comprising identifying a type of the mobile data memory or the mobile computer.

29. The method according to claim 28, further comprising selecting information about at least one of (a) the image of at least one of (a) the mobile data memory or (b) the mobile computer or (b) the portion of the image of at least one of (a) the mobile data memory or (b) the mobile computer on an information memory as a function of the identified type of at least one of (a) the mobile data memory or (b) the mobile computer, the information memory adapted to store information about at least one of (a) at least one image of at least two of (a) the mobile data memory or (b) the mobile computer or (b) at least one portion of at least one image of at least two of (a) the mobile data memory or (b) the mobile computer.

30. A motor vehicle, comprising:
- an interface adapted to exchange data between the motor vehicle and at least one of (a) a mobile telephone, (b) a mobile data memory or (c) a mobile computer, the interface being positioned in the motor vehicle;
- a display including an assigned control system adapted to simultaneously display at least two of (a) an image, including at least one operating element, of at least one of (a) the mobile telephone, (b) the mobile data memory or (c) the mobile computer or (b) a portion of an image, including at least one operating element, of at least one of (a) the mobile telephone, (b) the mobile data memory or (c) the mobile computer on the display such that the at least one operating element of the at least two of (a) the image or (b) the portion of the image are simultaneously operable via the display; and
- a touch screen, disposed above the display, adapted to operate at least one of (a) the mobile telephone, (b) the mobile data memory or (c) the mobile computer by at least one of (a) touch of the touch screen in the region of the displayed operating element or (b) by press on the touch screen in the region of the displayed operating element;
- wherein the display of the communication system is also utilized by at least one of a climate-control device, an infotainment system, and/or a navigation system of the motor vehicle; and
- wherein the control system is adapted to query whether the at least one of (a) the mobile telephone, (b) the mobile data memory, or (c) the mobile computer is to be operated by the display or the touch screen when the display is utilized by the at least one of the climate-control device, the infotainment system, and/or the navigation system of the motor vehicle;
- wherein the control system is further adapted, based on a result of the query, to determine whether the display is to continue to show the at least one of the climate-control device, the infotainment system, and/or the navigation system of the motor vehicle, or the display is to show the display of the at least two of (a) an image, including at least one operating element, of at least one of (a) the mobile telephone, (b) the mobile data memory or (c) the mobile computer or (b) a portion of the image, including at least one operating element, of at least one of (a) the mobile telephone, (b) the mobile data memory or (c) the mobile computer.

31. The communication system according to claim 1, wherein the display is adapted to display an upper portion of at least one of (a) the mobile telephone, (b) the mobile data memory or (c) the mobile computer next to a lower portion of at least one of (a) the mobile telephone, (b) the mobile data memory or (c) the mobile computer.

32. The method according to claim 10, wherein the display is adapted to display an upper portion of at least one of (a) the mobile telephone, (b) the mobile data memory or (c) the mobile computer next to a lower portion of at least one of (a) the mobile telephone, (b) the mobile data memory or (c) the mobile computer.

33. The information system according to claim 15, wherein the display is adapted to display an upper portion of at least one of (a) the mobile telephone, (b) the mobile data memory or (c) the mobile computer next to a lower portion of at least one of (a) the mobile telephone, (b) the mobile data memory or (c) the mobile computer.

34. The method according to claim 25, wherein the display is adapted to display an upper portion of at least one of (a) the mobile telephone, (b) the mobile data memory or (c) the mobile computer next to a lower portion of at least one of (a) the mobile telephone, (b) the mobile data memory or (c) the mobile computer.

35. The motor vehicle according to claim 30, wherein the display is adapted to display an upper portion of at least one of (a) the mobile telephone, (b) the mobile data memory or (c) the mobile computer next to a lower portion of at least one of (a) the mobile telephone, (b) the mobile data memory or (c) the mobile computer.

\* \* \* \* \*